United States Patent [19]

Hess et al.

[11] Patent Number: 5,455,907
[45] Date of Patent: Oct. 3, 1995

[54] BUFFERING DIGITIZER DATA IN A FIRST-IN FIRST-OUT MEMORY

[75] Inventors: Randall L. Hess, Cypress; Gaines C. Teague, Spring; Patrick R. Cooper, Houston; Daniel B. Reents, Spring; Hung Q. Le, Houston, all of Tex.

[73] Assignee: Compaq Computer Corp., Houston, Tex.

[21] Appl. No.: 119,718

[22] Filed: Sep. 10, 1993

[51] Int. Cl.$^6$ .................................................. G06F 15/00
[52] U.S. Cl. .......................... 395/162; 395/442; 395/893; 395/850; 395/728
[58] Field of Search .................................... 395/162–164, 395/275, 325, 250, 725, 425; 345/179, 180, 182, 183, 196

[56] References Cited

U.S. PATENT DOCUMENTS 4,730,186  3/1988  Koga et al. .............................. 345/179
5,329,615  7/1994  Peaslee et al. ........................... 395/162

OTHER PUBLICATIONS

Peripheral Components 1992, "UPI–452 CHMOS Programmable I/O Processor," Intel Corporation (1991) pp. 5–113 to 5–165.

Primary Examiner—Mark R. Powell
Assistant Examiner—Kee M. Tung
Attorney, Agent, or Firm—Pravel, Hewitt, Kimball & Krieger

[57] ABSTRACT

A computer system with a digitizer based screen display in which the digitizer data is buffered through a first-in first-out memory (FIFO). The processor is only interrupted when a full digitizer data packet is available in the FIFO, rather than being interrupted on each data byte available in the FIFO. The FIFO can hold multiple digitizer data packets, so that data is not lost should the processor in the computer system be unable to immediately handle these digitizer data packets. The system also provides a filter in a separate controller that examines each digitizer data packet to determine if the pen is in a predefined screen location that performs a prespecified function. If so, rather than pass the digitizer data packet to the system processor through the FIFO, the command is passed through a separate register to the processor based on the "hotspot" touched on the screen.

7 Claims, 5 Drawing Sheets

BUFFERING DIGITIZER DATA IN A FIRST-IN FIRST-OUT MEMORY

BACKGROUND OF THE INVENTION

1. Field of the Invention

The invention relates to a computer system with a digitizer and more specifically to the transmission of data and generation of interrupts from a digitizer to a computer system.

2. Description of the Related Art

Pen-based computing is a rapidly developing area in the field of personal computer systems. These systems provide pen input by allowing the user to directly write on the displayed screen of a typically notepad size, or smaller system.

A digitizer of some sort detects the position of the pen and then provides that data to the system. Such a digitizer can operate based on a variety of principles, including capacitive, mechanical, or electromagnetic. Whatever its principle of operation, the digitizer, through its controller circuitry, sends out a stream of data in various formats and in various modes, such as incremental mode, absolute mode, and pen-down tracking mode. These data packets tend to be rather large, as the system must know pen location with a high degree of precision. Further, the data must be passed very quickly to track all of the points a pen passes through as a user writes at even normal speed. Typically, the data packets will range from 4 to 10 bytes in length, and must be passed around 100 times per second.

These high data rates and large packet sizes can create problems, such as the dropping out of data packets because the system processor may not have time to process each packet before the next packet becomes available. It would be desirable to prevent such dropouts.

Further, the digitizer data packet must generally be broken up into smaller data elements, as the processor I/O data size is typically only 8 bits when communicating with a digitizer. Thus, when a digitizer is providing 100 data packets per second and each data packet is five bytes in size, for example, this would involve an effective communications rate of 5,000 data bytes per second. Typical digitizer communications hardware interrupts the processor each time another data byte of a digitizer data packet is available. This would translate to 5,000 interrupts per second, and would greatly burden the system in handling these digitizer data packets. Thus, it would be desirable to relieve a microprocessor of some of the overhead of handling these large digitizer data packets at these high data rates.

SUMMARY OF THE PRESENT INVENTION

A computer system constructed according to the invention includes a first-in first-out memory (FIFO) that stores digitizer data packets as they are transmitted to the system processor. Data is loaded into and transferred out of the FIFO at one discrete data size, such as a byte, that is typically smaller than the size of a digitizer data packet.

Further, a system constructed according to the invention includes interrupt latching circuitry which first, does not interrupt the processor until at least one full digitizer data packet is available in the FIFO, and second, allows the latching of multiple interrupts when the FIFO contains more than one digitizer data packet available for transmission to the processor. As packets are written to the FIFO from the digitizer control circuitry, additional interrupts are latched; as packets are read from the FIFO, a subsequent interrupt is generated to the processor for each packet read until no more packets remain in the FIFO. Data can be written into and read from the FIFO simultaneously—that is, all of the bytes of a packet need not be read by the processor before bytes of a new packet are written, and vice versa.

Further in a system constructed according to the invention, before a packet is transmitted to the FIFO, hardware checks to determine whether a digitizer packet indicates the pen is in a screen location within certain "hotspots", or predefined areas that perform specified functions when activated. If so, the packet is not sent to the FIFO at all, but instead, a command byte is sent to the processor, thus allowing the transmission of a smaller command rather than a full digitizer data packet, and further relieving the processor of checking each packet from the FIFO to determine whether it is in such a predefined area.

BRIEF DESCRIPTION OF THE DRAWINGS

A better understanding of the present invention can be obtained when the following detailed description of the preferred embodiment is considered in conjunction with the following drawings, in which.

Figure 1:
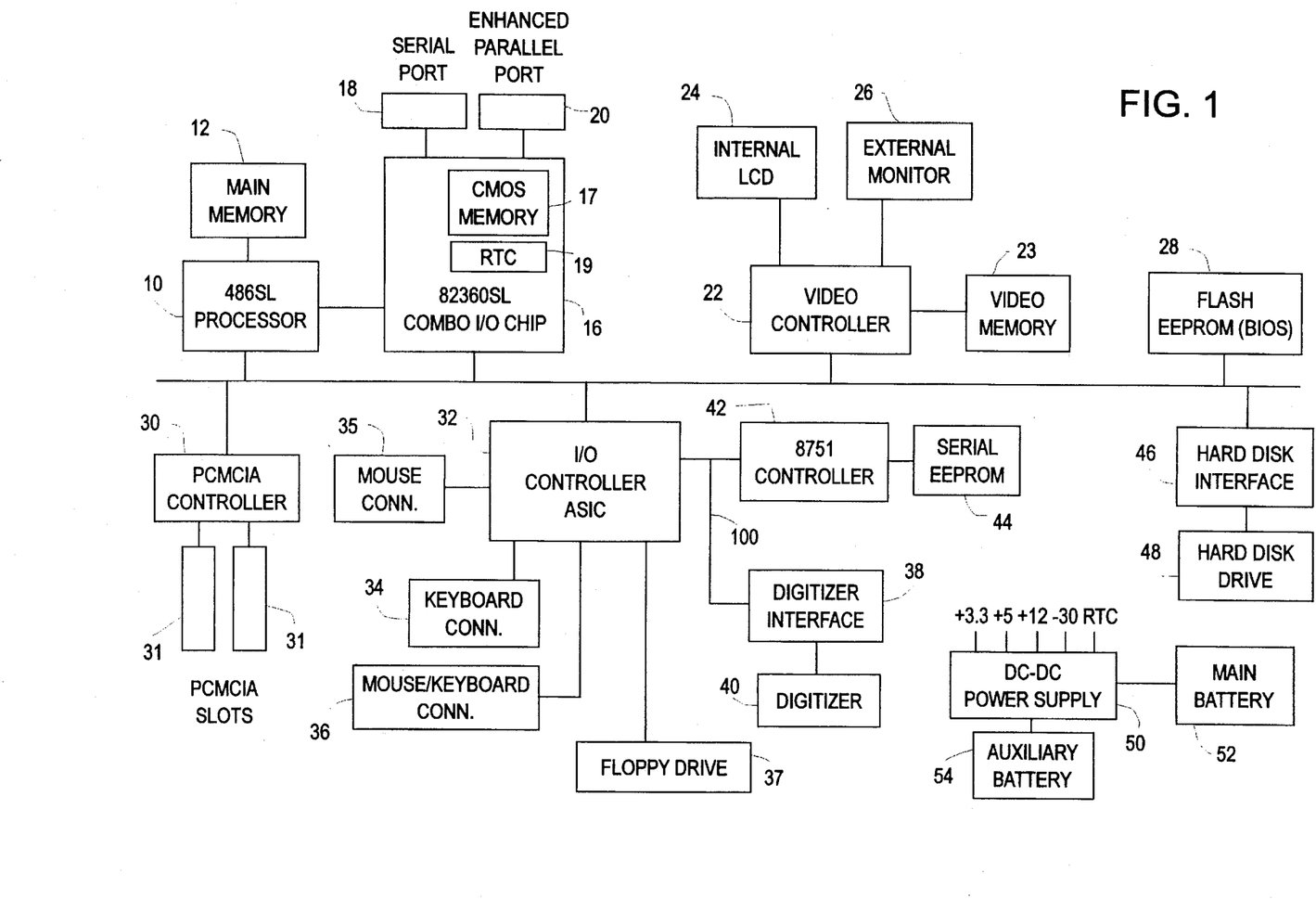
FIG. 1 is a block diagram of a system in which the apparatus and method according to the invention could be implemented.

DETAILED DESCRIPTION OF THE PREFERRED EMBODIMENT:

Proceeding now to FIG. 1, a computer C according to the present invention is shown. A microprocessor 10, preferably the 486SL processor from Intel Corporation (Intel), forms the main computing element of the computer C. Main memory 12 is connected to the processor 10 over a memory bus. A bus 14 is connected to the processor 10 and includes address, data and control portions to form a main communication bus to the various components in the computer C. One such component is a combination I/O chip 16, preferably the 82360SL from Intel. A separate connection preferably is made between the processor 10 and the combo I/O chip 16 to provide the special connections between the 486SL and the 82360SL. A serial port 18 and an enhanced parallel port 20 are provided from the combo I/O chip 16. A video controller 22 is connected to the bus 14 to receive commands from the processor 10 and video memory 23 is connected to the video controller 22. An internal liquid crystal (LCD) display 24 is connected to the video controller 22 and in certain cases an external monitor 26, typically a CRT, can be connected to the video controller 22 as desired.

As the computer C must contain certain basic operating routines to allow the computer to boot and to perform certain fundamental system functions, these routines being generically referred to as the BIOS, a flash EEPROM 28 is connected to the bus 14 to contain these routines. This could instead be a standard ROM. Not shown for clarity are the necessary connections to allow programming and erasing to occur as these are well known to those skilled in the art. A PCMCIA controller 30 is connected to the bus 14 and in turn has two PCMCIA slots 31 connected to it. The PCMCIA slots 31 provide expansion capabilities for the computer C to provide additional memory if desired or to receive certain communications options, such as modems and network cards.

An I/O controller application specific integrated circuit (ASIC) 32 is connected to the bus 14. The I/O controller ASIC 32 provides numerous special functions in the computer C. The I/O controller ASIC 32 contains the necessary shift registers and clock logic to allow connection of a mouse or other pointing device to a mouse connector 35, a keyboard to a keyboard connector 34, and a mouse or other pointing device or a keyboard to a mouse/keyboard connector 36.

In addition, the I/O controller ASIC 32 contains the necessary interfaces to connect to a floppy drive 37 and to a digitizer interface 38. The digitizer interface 38 is in turn connected to a digitizer 40 to allow pen input information to be utilized in the computer C. The I/O controller ASIC 32 and the digitizer interface 38 also preferably include various registers to allow them to be used in combination with an 8051 or 8751 microcontroller 42. This is preferably an 8751FB microcontroller from Intel Corp., as that microcontroller responds to interrupts even when it is in a standby state. When used with an 8751 controller 42, the I/O controller 32 appears to the processor 10 as an 8042-type microcontroller as commonly used as a keyboard and auxiliary device controller in a conventional desktop personal computer. Thus the I/O controller ASIC 32 contains certain elements to mimic the register set and which are accessible by the 8751 controller 42. In this manner the 8751 controller 42 need not perform many of the actual conventional 8042 keyboard controller low level functions, such as the keyboard and aux port serial communications, as these functions are done in the I/O controller ASIC 32 to relieve the burdens on the 8751 controller 42.

The digitizer interface 38 connects to both the I/O controller ASIC 32 and the 8751 controller 42. Over the 8751 controller 42 controller bus 100. As is discussed below in conjunction with FIG. 2, both the digitizer interface 38 and the I/O controller ASIC 32 appear to the 8751 controller 42 as a bank of memory mapped I/O registers. This, along with further details of the I/O controller ASIC 32, the 8751 controller 42, and the digitizer interface 38 are described in more detail in conjunction with the discussion of FIG. 2 below.

The 8751 controller 42 is connected to a serial EEPROM 44. Preferably the serial EEPROM 44 is small but still contains enough space for an entire copy of the data in the CMOS memory 17 which is contained in the combo I/O chip 16. Preferably the serial EEPROM 44 contains 128 16 bit storage locations, each location being individually addressable and erasable. The 8751 controller 42 is properly connected to the serial EEPROM 44 according to the manufacturer's instructions to allow programming and serial communication of data. For a more detailed description of this configuration, please refer to Ser. No. 08/119,691, entitled PERSONAL COMPUTER WITH CMOS MEMORY NOT HAVING A SEPARATE BATTERY, which is filed currently herewith and which is hereby incorporated by reference.

A hard disk interface 46 is also connected to the bus 14 to allow the processor 10 to interface with a hard disk drive 48 for mass storage.

The computer C also includes a power supply. A DC/DC power supply 50 provides the necessary voltages used in the computer C, such as +3.3, +5, +12, −30 and a voltage provided to the CMOS memory 17 and the RTC 19. The CMOS/RTC voltage is provided separately to allow the remaining components of the computer C to be powered off to allow the computer C to be placed in a very low power standby condition. The DC/DC power supply 50 is connected to a main battery 52 of the computer C and a small auxiliary battery 54.

Figures 2, 3:
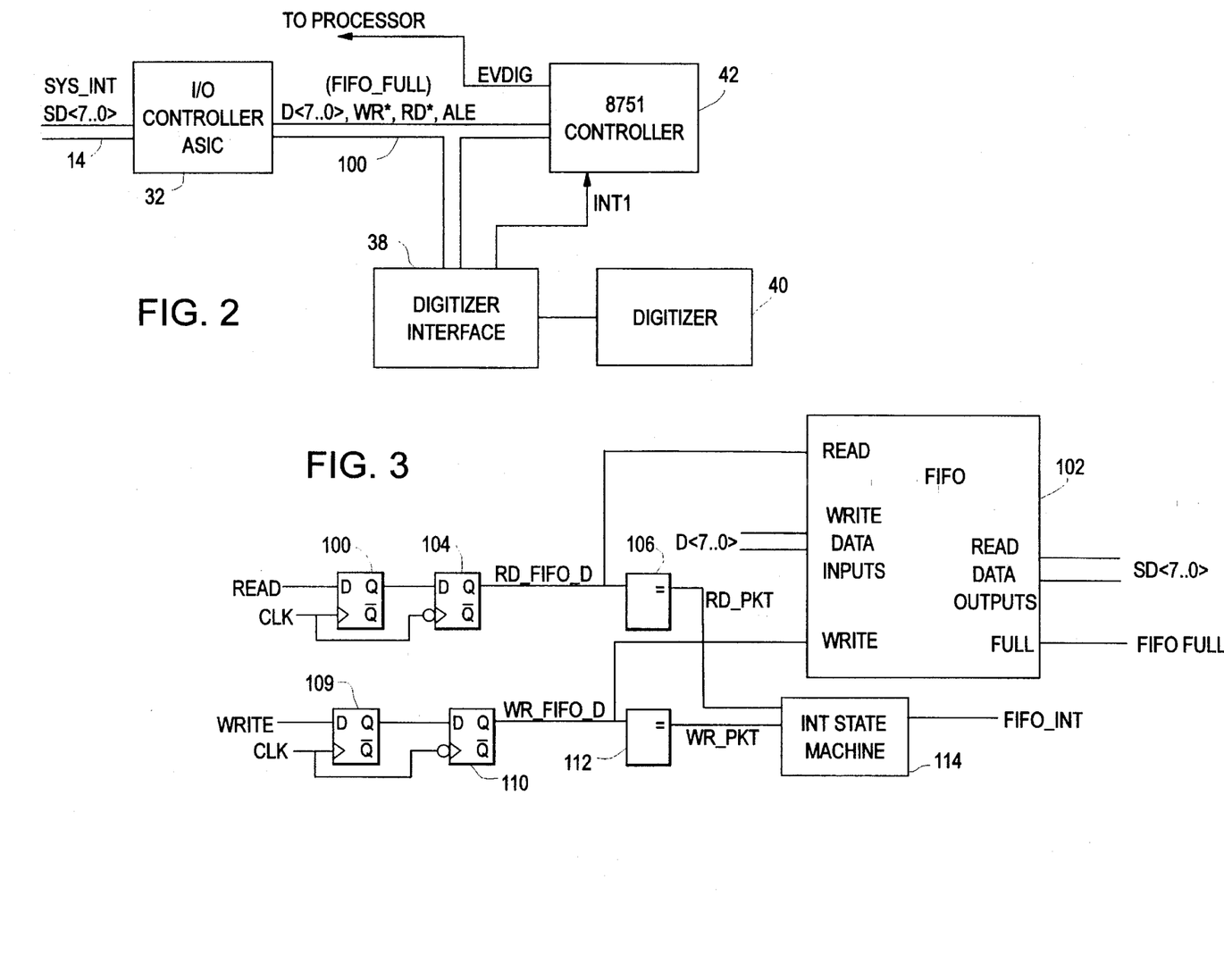
FIG. 2 is a more detailed block diagram showing the relationships between the I/O controller, the 8751 controller, the digitizer interface, and the digitizer according to the invention.
FIG. 3 is a schematic/block diagram showing the FIFO, interrupt state machine, and FIFO read and write circuitry as implemented according to the invention.

Turning to FIG. 2, further details of the I/O controller ASIC 32, the digitizer interface 38, the digitizer 40, and the 8751 controller 42 are shown. The I/O controller ASIC 32, the digitizer interface 38, the 8751 controller 42 are all interconnected by the controller bus 100, which includes address/data signals AD<7..0> and typical I/O control signals, such as a write signal WR*, a read signal RD*, and an address latch enable signal ALE, which latches an address onto AD<7..0>, as opposed to a data byte. These are more fully defined in the description of the Intel 8751 Microcontroller, found in 8-*Bit Embedded Controllers,* Copyright 1990 Intel Corporation, which is hereby incorporated by reference.

An 8751 microcontroller includes provisions for external memory, which is used for memory mapped I/O. The I/O controller ASIC 32 and the digitizer interface 38 contain memory mapped I/O registers, through which they communicate with the 8751 controller 42, appearing to the 8751 controller 42 as external memory locations. Using these memory mapped I/O registers, the I/O controller ASIC 32, for example, transmits a data byte including a FIFO_FULL bit, indicating an internal FIFO 102, to be discussed below in conjunction with FIG. 3, is full and can receive no more data from the 8751 controller 42. Also connected to the digitizer interface 38 is the digitizer 40. The digitizer interface 38 provides the necessary analog and digital circuitry for determining pen location on the digitizer 40, determining pen status on the digitizer 40, and performing various other digitizer oriented functions. When the digitizer interface 38 has formed a full unfiltered data packet from the digitizer 40, it interrupts the 8751 controller 42 over an interrupt line INT1. The digitizer interface 38 then transmits that unfiltered data packet as a series of data bytes to the 8751 controller 42 through a memory mapped I/O register. This unfiltered data packet size is arbitrary, and is here 5 bytes.

The 8751 controller 42 is further connected to a digitizer event signal line EVDIG, which provides a signal to the processor 10 through interrupt circuitry (not shown) to indicate a digitizer event has occurred. This is not crucial to the operation of the system C, but it does provide the processor 10 with further information concerning the digitizer 40.

As is discussed below in conjunction with FIGS. 6 and 7, the 8751 controller 42 then filters and linearizes the unfiltered data packets and then transmits the resulting digitizer data packets to the I/O controller ASIC 32 through memory mapped I/O registers. If the digitizer data packet indicates that the pen is in a predefined area of the screen, or a "hotspot" the 8751 controller 42 instead transmits a single byte of information to the processor 10 through a mailbox register in the I/O controller ASIC 32 indicating such a hotspot detection. Further, the I/O controller ASIC 32 provides an interrupt signal SYS_INT to the processor 10 for a variety of purposes, including to indicate the presence of at least one digitizer data packet in the FIFO 102 and to indicate the presence of a hotspot command character in the mailbox register of the I/O controller ASIC 32 indicating hotspot presence detection.

Turning to FIG. 3, that figure is a schematic/block diagram showing further details of the circuitry for providing a FIFO packet available interrupt FIFO_INT and for storing digitizer data packets in the I/O controller ASIC 32. FIFO_INT is provided as one of the signals used to cause SYS_INT to go true, indicating to the processor 10 that an interrupt has occurred from the I/O controller ASIC 32. FIFO_INT further causes internal circuitry of the I/O controller ASIC 32 not shown to store a flag indicating that SYS_INT has interrupted the processor 10 because of a FIFO interrupt as indicated by FIFO_INT. The processor 10 then reads a register from the I/O controller ASIC 32 to make the determination that the interrupt was in fact initiated by the FIFO circuitry. Certain details and timing information are omitted for clarity, but will be readily apparent to one skilled in the art of digital design.

The FIFO 102 is preferably a circular, 32-byte FIFO. The construction of first-in first-out memories is well known in the area of digital design, so the internal construction of the FIFO 102 is omitted for clarity. As an example of a FIFO, the standard 74LS222 is a FIFO memory with 16 4-bit words. The FIFO 102 includes internal address counters, and provides a full output signal FIFO_FULL as true when there is not enough space for another digitizer data packet to be written into the FIFO 102. Whether, in the parlance digitizer design, to denominate FIFO_FULL as a "full" output signal or an "almost full" output signal is a question of choice of nomenclature and is particularly dependent on packet size. When FIFO_FULL is true, enough room may remain in the FIFO 102 for more data bytes, but there is not enough room for a digitizer data packet. So, FIFO_FULL is then equivalent to a FIFO almost full signal. In other cases where the FIFO is an integer multiple of the packet size, then FIFO_FULL is equivalent to a FIFO full signal. In either case, FIFO_FULL as used herein indicates that there is not sufficient space remaining for an entire packet. FIFO_FULL is provided to the 8751 controller 42 through a memory mapped I/O register.

The FIFO 102 includes write data inputs that are provided by D<7..0>, which on a FIFO write is driven by the 8751 controller 42. The FIFO 102 also includes read data outputs that are provided to SD<7..0>, which the FIFO 102 provides to the processor 10 on a FIFO read. The write data is stored in the FIFO 102 when its write input receives a FIFO write signal WR_FIFO true, and the read data is provided by the FIFO 102 when its read input receives a FIFO read signal RD_FIFO true.

As previously noted, the digitizer data packet size is generally greater than a byte, which here is the FIFO read and write data size. This logical digitizer data packet size is preferably loaded into the I/O controller ASIC 32 by a memory mapped I/O write from the 8751 controller 42.

A read signal READ is provided by other circuitry in the I/O controller ASIC 32, indicating that the processor 10 has requested a byte of digitizer data from the FIFO 102. Similarly, a write signal WRITE is provided by other circuitry in the I/O controller ASIC 32, indicating that the 8751 controller 42 is sending a byte of digitizer data to the FIFO 102.

READ is synchronized to an internal clock signal CLK in the I/O controller ASIC 32 by a D flip-flop 100, which is clocked by CLK. CLK can run at any arbitrary speed, preferably 12 MHz. READ is provided as the D input of the flip-flop 100. The Q output of the flip-flop 100 is provided as RD_FIFO and is also provided as the D input to a D flip-flop 104, which is clocked on the negative edge of CLK and which provides as its Q output a signal RD_FIFO_D, which is a delayed counter part of RD_FIFO. As is apparent, RD_FIFO is a read request for a byte of data, whereas a digitizer data packet is some larger size, here 5 bytes. So RD_FIFO_D is provided to a counter 106, whose output provides a data packet read signal RD_PKT, which goes true for one clock pulse after one packet size number of data bytes have been read using RD_FIFO. As the packet size is here 5, RD_PKT is thus true every fifth assertion of RD_FIFO. Thus, RD_FIFO initiates a data byte read, while RD_PKT indicates a packet read has been completed.

WRITE is provided to the D input of D flip-flop 108, which is clocked by CLK. The Q output is provided as WR_FIFO and also as the D input of a D flip-flop 110, whose Q output provides a signal WR_FIFO_D, a delayed counter part of WR_FIFO. The flip-flop 110 is clocked on the negative edge of CLK.

Figure 4A:
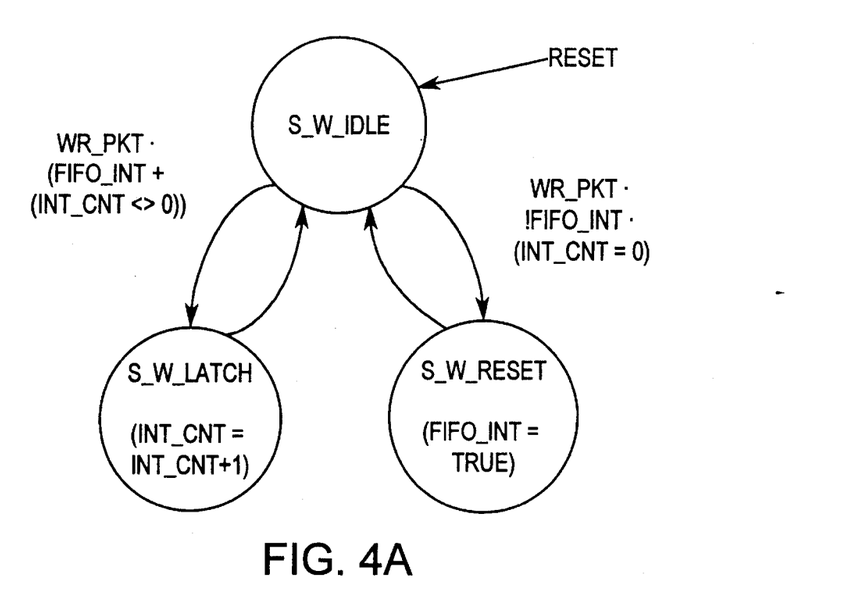
FIGS. 4A and 4B shows an embodiment of the state machine in which two separate state machines are implemented for packet reads and packet writes.
Figure 4B:
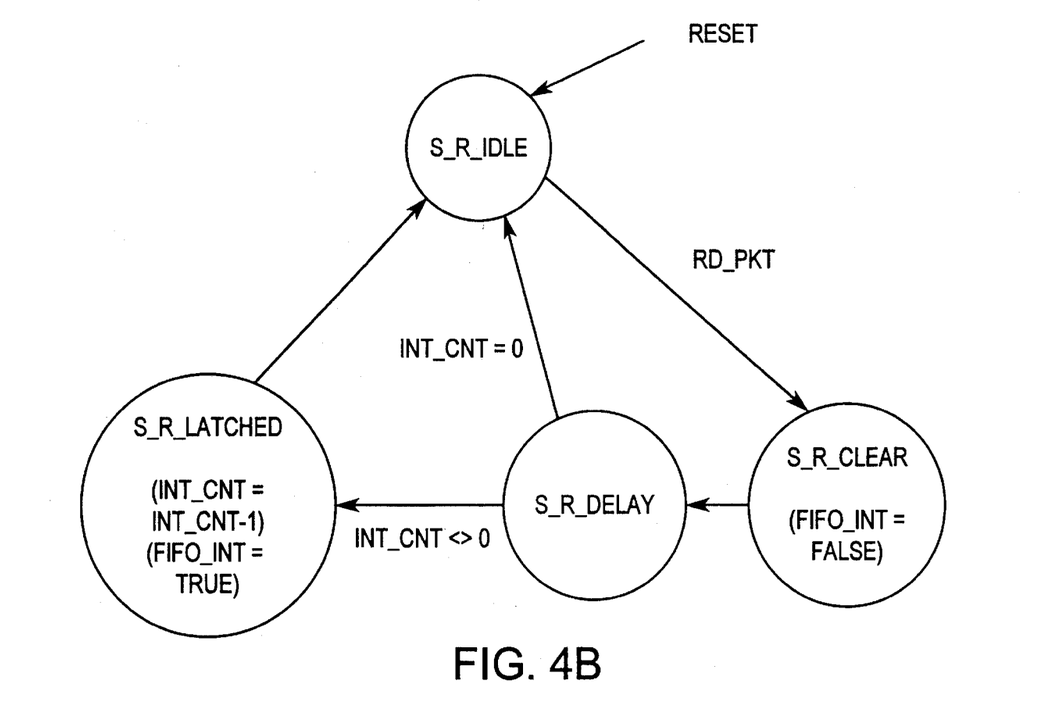

WR_FIFO_D is provided to a counter 112, which corresponds to the counter 106 above. It counts the number of data byte writes to the FIFO 102 by WR_FIFO until an entire data packet has been written, here 5 bytes. Then, the output of the counter 112 is provided as a one clock pulse data packet write signal WR_PKT to indicate a packet write. RD_PKT and WR_PKT are provided to an interrupt state machine 114, which provides FIFO_INT to other circuitry in the I/O controller ASIC 32 when a digitizer data packet is available for reading from the FIFO 102. This interrupt state machine 114 is discussed below in conjunction with FIGS. 4 and 5A–5B.

Other hardware handles loading the packet data size into the counters 106 and 112 (preferably by a memory mapped I/O write from the 8751 controller 42) and otherwise reading and writing status to various parts of the FIFO control circuitry shown in FIG. 3. This is standard hardware well known in the field of digital design. Further, other hardware handles error conditions, such as overflowing of the FIFO 102. This should generally not be necessary anyway, as the software in the 8751 controller 42 first checks to determine FIFO space available for writing to the FIFO 102 through the FIFO_FULL flag, and the processor 10 should not read from the FIFO 102 when the FIFO 102 is empty. Also not shown is FIG. 3 for clarity is typically reset circuitry.

FIGS. 4A and 4B are state diagrams of the state machine 114 of FIG. 3, illustrating FIFO packet writes and FIFO packet reads in two separate state diagrams. Both state machines are clocked on the CLK signal. FIG. 4A shows the write portion of the state machine as implemented in the interrupt state machine 114. Beginning at a write idle state S_W_IDLE, which is always entered on a reset condition, the write state machine only undergoes a transition when a packet write occurs as indicated by WR_PKT. When WR_PKT is not true, operation remains in the S_W_IDLE state. When WR_PKT goes true, if FIFO_INT is false and INT_CNT is equal to zero, the state machine proceeds to an interrupt set state S_W_SET. On entering the S_W_SET state, FIFO_INT is set true forcing an interrupt to the processor 10 through SYS_INT, and the state machine returns to the S_W_IDLE state. Preferably the FIFO_INT signal is set on the falling edge of the CLK signal.

From the S_W_IDLE state, if WR_PKT goes true but either FIFO_INT is true or INT_CNT is not equal to zero, there is currently an outstanding interrupt, so the state machine proceeds to a latched interrupt state S_W_LATCH. There, INT_CNT is incremented, and the state machine returns to the S_W_IDLE state. Preferably INT_CNT is incremented on the falling edge of the CLK signal.

FIG. 4B illustrates the read portion of the interrupt state machine 114. As with the write state machine, a read idle state S_R_IDLE is entered upon reset and remains there while RD_PKT is false.

From the S_R_IDLE state, on a packet read as indicated by RD_PKT, the read state machine proceeds to an interrupt clear state S_R_CLEAR, which sets FIFO_INT false. This is because whenever a packet read is completed, the interrupt should be reset, either so that the processor 10 can then wait for the next packet write or so that another interrupt can be immediately sent out indicating another packet is available. FIFO_INT is also preferably cleared on the falling edge of CLK.

From the S_R_CLEAR state, control proceeds to an intermediate state S_R_DELAY. From this state, if INT_CNT is equal to zero, the read state machine then returns to the S_R_IDLE state, as there are no more outstanding packets to read.

If from the S_R_DELAY state INT_CNT is not equal to zero, however, this indicates there are latched interrupts (i.e., remaining packets to read) so the read state machine proceeds to a latched read available state S_R_LATCHED, where INT_CNT is decremented and FIFO_INT is set to true. Again, these two operations preferably occur on the falling edge of CLK. Should the write state machine simultaneously be in the S_W_LATCH state, INT_CNT will actually remain the same and only FIFO_INT will be set. The read state machine then returns to the S_R_IDLE state.

As can be seen, the write state machine of FIG. 4A and the read state machine of FIG. 4B coordinate with each other to appropriately set FIFO_INT to true when read packets are available and the processor 10 is no longer processing a previous packet read.

Figure 5:
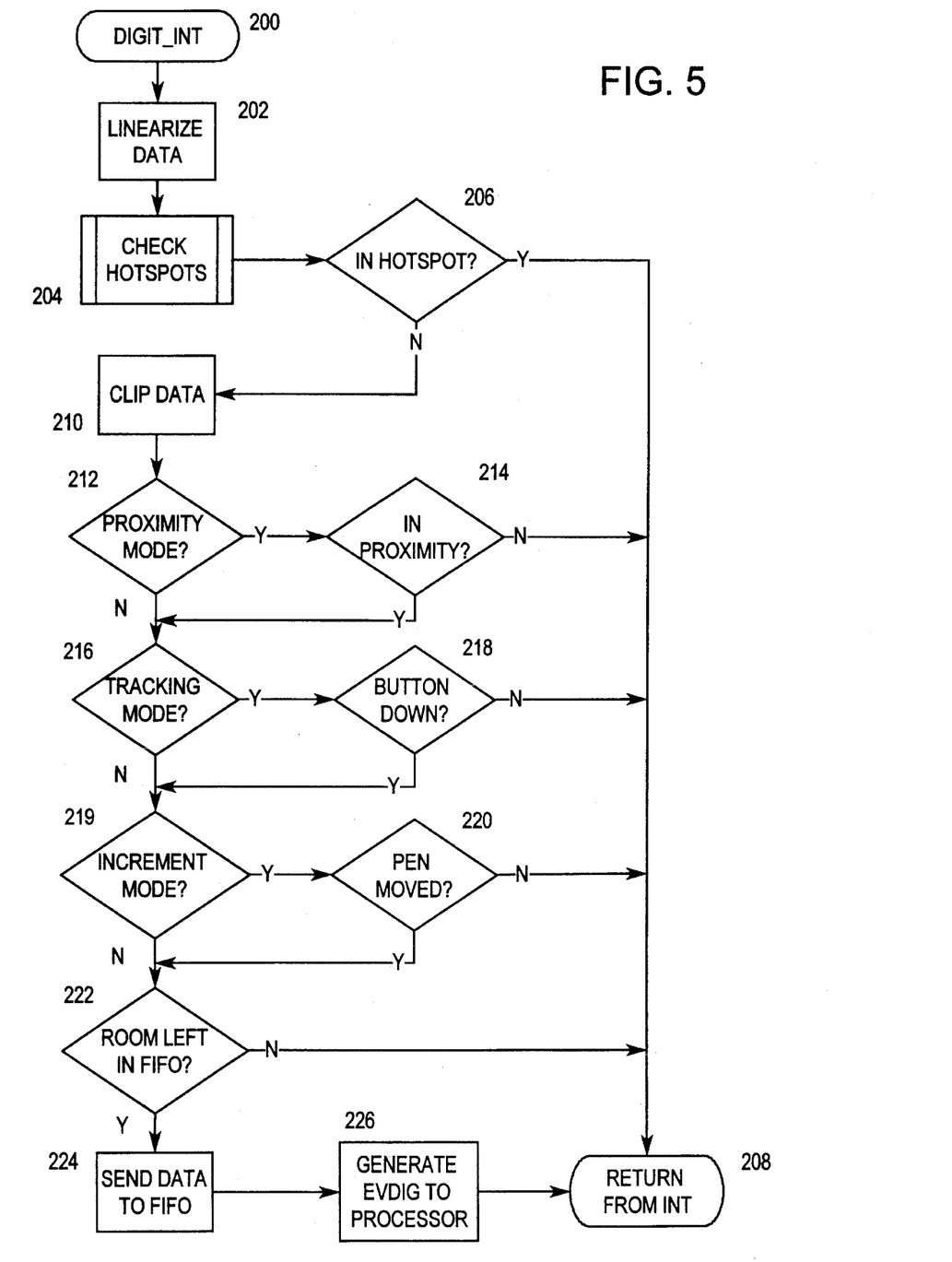
FIG. 5 is a flowchart of a digitizer interrupt routine implemented in the 8751 controller.

FIG. 5 is a flowchart of a digitizer interrupt processing routine DIGIT_INT 200, which is implemented in the 8751 controller 42 and is entered when INT1 from the digitizer interface 38 goes true, indicating an unfiltered digitizer data packet is available from the digitizer interface 38. Beginning at step 202, the DIGIT_INT routine 200 first linearizes the data from the digitizer interface 38. This involves adjusting the data for non-linearities, adjusting for pen tilt, and various other massaging of the unfiltered digitizer data packet as is well known in digitizer design. The result of step 202 in the preferred embodiment is a 5 byte digitizer data packet indicating the data coordinates of the pen on the digitizer 40.

Proceeding to step 204, the DIGIT_INT routine 200 calls a CHK_HOTSPOTS routine 300, which determines whether the digitizer pen is located in one of the specially defined screen areas, and is discussed below in conjunction with FIG. 6. If at step 206 the CHK_HOTSPOTS routine 300 indicated that the pen is in such a hotspot, the DIGIT_INT routine 200 returns from the interrupt at step 208 without sending the data packet to the FIFO 102.

If at step 206 it was determined that the pen is not in such a hotspot, the DIGIT_INT routine 200 proceeds to step 210, where it clips the data in the digitizer data packet according to the screen boundaries. Then, at step 212 the DIGIT_INT routine 200 determines if the digitizer software is in a proximity mode, which indicates a digitizer data packet is only to be sent to the processor 10 via the FIFO 102 when the pen is in proximity of a certain area. If in such a proximity mode, the DIGIT_INT routine 200 proceeds to step 214, where it determines if in fact the pen is in the proximity of that predefined area. If not, the DIGIT_INT routine 200 returns from the interrupt at step 208.

Otherwise from step 212 and step 214, the DIGIT_INT routine 200 proceeds to step 216, where it determines if the digitizer software is in a tracking mode. If so, at step 218 the DIGIT_INT routine 200 checks to determine if the button is down on the pen. If not, the DIGIT_INT routine returns from the interrupt at step 208, because in tracking mode, the 8751 controller 42 only sends data when the pen button is down.

Otherwise from steps 216 and 218, the DIGIT_INT routine 200 proceeds to step 219, where it determines whether the processor 10 has placed the digitizer software into an increment mode. If so, at step 220 the DIGIT_INT routine 200 determines whether the pen has moved since the previous check. If not, the DIGIT_INT routine 200 exits at step 208, because when in digitizer increment mode, the 8751 controller 42 only sends digitizer data on changes in the pen location.

Otherwise from steps 219 and 220, the DIGIT_INT routine 200 proceeds to step 222, where it determines whether there is room left in the FIFO 102 in the I/O controller ASIC 32 for another digitizer data packet. This is determined by reading a status bit from a memory mapped I/O register in the I/O controller ASIC 32, that status bit containing the state of FIFO_FULL. If there is no room left in the FIFO 102, the DIGIT_INT routine 200 returns from the interrupt at step 208. Otherwise from step 222, the DIGIT_INT routine 200 proceeds to step 224, where it sends the digitizer data packet to the FIFO 102 in the I/O controller ASIC 32 by a series of data byte writes through memory mapped I/O. Then, at step 226 the DIGIT_INT routine 200 generates an EVDIG interrupt to the processor 10. The DIGIT_INT routine 200 then returns from the interrupt at step 208.

Figure 6:
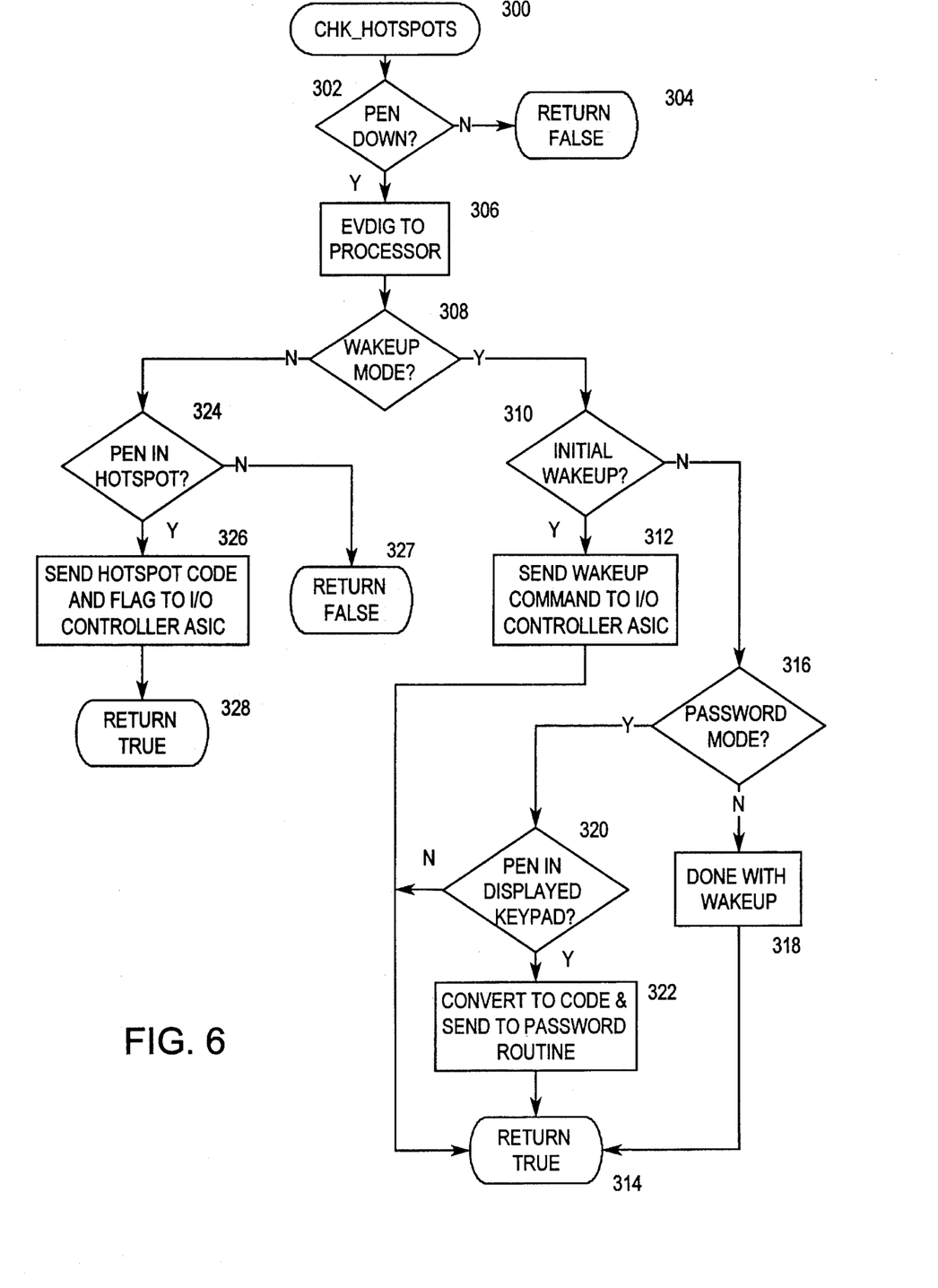
FIG. 6 is a hotspot checking routine also implemented in the 8751 controller.

FIG. 6 is a flowchart of the CHK_HOTSPOTS routine 300. This routine filters the digitizer data packets to determine whether they are in a predefined area of the digitizer screen, in which case a single byte command is sent to the processor 10 via the I/O controller ASIC 32 through a memory mapped I/O mailbox.

Starting at step 302, the CHK_HOTSPOTS routine 300 determines whether the pen has just been placed down onto the digitizer. If not, it returns at step 304. Otherwise, it proceeds to step 306, where it sends an EVDIG interrupt to the processor 10, indicating digitizer pen activity.

Proceeding to step 308, the CHK_HOTSPOTS routine 300 determines whether the 8751 controller 42 is in a wake-up mode. This occurs, for example, when a user touches the blank screen in order to bring the system C back on line when the system C was in a stand-by, or sleep, condition. If in a wake-up mode, the CHK_HOTSPOTS routine 300 proceeds to step 310, where it determines if this is the initial wake-up activity of the digitizer 40, such as first touching the pen to the screen. If so, the CHK_HOTSPOTS routine 300 sends a wake-up command to the processor 10 via the I/O controller ASIC 32 at step 312, and returns with a hotspot parameter flag being true, indicating hotspot activity, and thus that the DIGIT_INT routine 200 should not process the current digitizer data packet.

If at step 310 this was determined not to be the initial wake-up, the CHK_HOTSPOTS routine 300 proceeds to step 316, where it determines whether the 8751 controller 42 is in password mode. In this mode, when the user touches the screen while the screen is blanked in stand-by, an image of a keypad is placed onto the screen by the video controller 22 and the user then enters a personal identification number (PIN) before system activity is allowed.

If not in the password mode at step 316, the 8751 controller 42 is done processing this wake-up digitizer input at step 318, so the CHK__HOTSPOTS routine 300 returns with a true parameter at step 314. Otherwise, the CHK__ HOTSPOTS routine 300 proceeds to step 320, where it determines whether the pen is located somewhere within the displayed keypad. If not, the CHK__HOTSPOTS routine 300 returns with a true parameter at step 314. If so, however, the CHK__HOTSPOTS routine 300 proceeds from step 320 to step 322, where it converts the pen location touched on the digitizer 40 to a code and sends that code to a password routine. This routine then handles the input of a password to take the system out of a blanked screen stand-by mode.

If at step 308 the 8751 controller 42 was not in a wake-up mode, the CHK__HOTSPOTS routine 300 proceeds to step 324, where it determines whether the pen is located in a hotspot, or a particular screen location with a dedicated function. If not, it returns at step 326 with its return hotspot activity parameter set to false.

If the pen is in a hotspot as indicated by examination of the digitizer data packet at step 324, the CHK__HOTSPOTS routine 300 proceeds to step 328, where it sends a hotspot code and an activity flag to the I/O controller ASIC 32, which in turn passes that code on to the processor 10 after interrupting the processor through SYS__INT. The CHK__ HOTSPOTS routine 300 then returns a true parameter to the DIGIT__INT routine 200 at step 328, thus indicating hotspot activity and that the DIGIT__INT routine 200 should not send the digitizer data packet to the FIFO 102.

One skilled in the art will recognize that these routines and hardware relieve the processor 10 of much of the burden of handling digitizer I/O. The processor 10 only receives interrupts when a full digitizer data packet is available rather than when each byte of a data packet is available from the 8751 controller 42, thus saving substantial interrupt processing overhead. Further, by using hotspots, dedicated functions on the screen are then passed as one byte commands rather than full digitizer data packets. Further, the 8751 controller 42 performs the arithmetic to determine if a hotspot was touched, thus alleviating the need for the processor 10 to check each digitizer data packet to see if it is in a hotspot. This relieves the processor 10 of a significant computing burden, as otherwise for each of the hundred digitizer data packets sent to the processor 10 every second, the processor 10 would have to check each of those digitizer data packets to determine whether it was in a hotspot location.

Although the described embodiment uses a screen with a superimposed digitizer, one skilled in the art will recognize that the invention is just as applicable as stand alone digitizers. On such a digitizer, the hotspot functionality could also be used either with hotspots delineated on the digitizer itself, or with overlays available for providing different hotspot configurations, for example.

Also, although the described embodiment implements an I/O controller ASIC 32, an 8751 controller 42, and a digitizer interface 38, one skilled in the art will recognize that functionality could be differently distributed without departing from the spirit of the invention. For example, the 8751 controller 42 and the I/O controller ASIC 32 could be combined in a single chip, or the FIFO could be integrated into the digitizer interface 38 itself.

Further, although in the described embodiment hotspot data is passed through a separate registers, it could instead be placed in the FIFO 102. This would still alleviate the need for the processor 10 to check each digitizer data packet for location within a predetermined hotspot.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A computer system for use with a digitizer and the digitizer's associated digitizer controller, providing digitizer data in packets having a total length, the computer system comprising:

a processor for receiving digitizer data from the digitizer controller based upon receipt of an interrupt signal;

a bus, said processor coupled to said bus;

a first-in first-out memory, said first-in first-out memory having a data width less than the total length of the digitizer data packet and coupled to the digitizer controller for receiving and storing digitizer data from the digitizer controller, said first-in first-out memory further being coupled to said bus and providing the stored digitizer data to said processor over said bus; and interrupt circuitry coupled to said first-in first-out memory and to said processor for providing said interrupt signal to said processor when said first-in first-out memory receives a complete packet of digitizer data from the digitizer controller.

2. The computer system of claim 1, further comprising:

an interrupt counter coupled to said first-in first-out memory that increments for each complete digitizer data packet written to said first-in first-out memory before a corresponding read of a complete digitizer data packet from said first-in first-out memory by said processor and that decrements for each read of a complete digitizer data packet by said processor from said first-in first-out memory before a corresponding write of a complete digitizer data packet to said first-in first-out memory from the digitizer controller; and wherein said interrupt circuitry is further responsive to said interrupt counter, sending said interrupt signal to said processor responsive to said processor reading a complete digitizer data packet from said first-in first-out memory when said interrupt counter is not equal to zero.

3. The computer system of claim 1, further comprising:

means for providing non-digitizer data to said processor, coupled to the bus to allow said processor to receive said non-digitizer data; and means coupled to the digitizer controller and said means for providing non-digitizer data for determining whether digitizer data corresponds to a digitizer location within a predetermined area, and if not, allowing the digitizer controller to provide the digitizer data to said first-in first-out memory, and if so, preventing the digitizer controller from providing the digitizer data to said first-in first-out memory and providing predetermined data to said means for providing non-digitizer data.

4. The system of claim 1, wherein digitizer data includes digitizer coordinate data.

5. A method for inputing digitizer data in a computer system that includes a processor, a first-in first-out memory having a given data width, and a digitizer having an interface and providing digitizer data packets of a length greater than the first-in first-out memory data width, comprising the steps of:

receiving a digitizer data packet from the digitizer interface;

storing the digitizer data packet in the first-in first-out memory;

providing an interrupt to the processor when the digitizer data packet has been stored in the first-in first-out memory; and transmitting the digitizer data packet to the processor.

6. The method of claim 5, further comprising the steps of:

before said step of transmitting the digitizer data packet, storing at least one more digitizer data packet in the first-in first-out memory; and after said step of transmitting the digitizer data packet, providing an interrupt to the processor responsive to said step of transmitting having transmitted the digitizer data packet and responsive to said at least one more digitizer data packet remaining in the first-in first-out memory.

7. The method of claim 5, further comprising the steps of:

before said step of storing the digitizer data packet, determining whether the received digitizer data packet corresponds to a digitizer location within a predetermined area, and if not, allowing the digitizer interface to provide digitizer data to said first-in first-out memory, and if so, preventing said steps of storing and transmitting, and instead providing predetermined non-digitizer data.

* * * * *